United States Patent [19]

Van Wagner

[11] 4,105,345

[45] Aug. 8, 1978

[54] EXPANDABLE PHOTORECEPTOR ENDBELLS

[75] Inventor: Edward Milton Van Wagner, Webster, N.Y.

[73] Assignee: Xerox Corporation, Stamford, Conn.

[21] Appl. No.: 662,060

[22] Filed: Feb. 27, 1976

[51] Int. Cl.[2] .................................................. F16B 2/02

[52] U.S. Cl. ........................................ 403/24; 403/41; 403/365; 355/3 DR; 242/72 R

[58] Field of Search .............. 355/3 DR; 29/110, 117; 242/72 R; 403/3, 4, 24, 365, 366, 42

[56] References Cited

U.S. PATENT DOCUMENTS

| | | | |
|---|---|---|---|
| 803,374 | 10/1905 | Volkerding | 242/72 R |
| 1,082,139 | 12/1913 | Ray | 242/72 R |
| 1,082,946 | 12/1913 | Grignard | 403/366 X |
| 1,552,009 | 9/1925 | Rebechini | 29/110 |
| 3,536,397 | 10/1970 | Van Wagner | 355/3 DR |
| 3,536,485 | 10/1970 | Roth et al. | 242/72 R |

*Primary Examiner*—Andrew V. Kundrat

*Attorney, Agent, or Firm*—James J. Ralabate; Clarence A. Green

[57] ABSTRACT

A drum support apparatus includes a drum with webs adapted to be fitted within grooves located on the interior of the drum. The webs are supported on a shaft that is cantilevered from a machine frame and have adjustable lugs attached thereto that fit within the grooves on the interior of the drum in order to maintain the outside surface of the drum concentric with the shaft and thereby reduce the possibility of drum run-out.

11 Claims, 2 Drawing Figures

EXPANDABLE PHOTORECEPTOR ENDBELLS

BACKGROUND OF THE INVENTION

This invention relates to drum support apparatus and more particularly to supports for photosensitive drums to prevent drum run-out.

In present reproduction machines, a problem has been encountered with photoreceptor drum radius run-out. The reason for the problem lies with the drums and how they are handled in manufacturing and in the field. Hitting the rim of the drum deforms the counterbore, and an out-of-tolerance condition occurs when conventional endbells, interference fitted with the drum, are reassembled in the drum. This is especially true of the inboard endbell in a number of reproduction machines, which is concave by about 5 inches. A slight cock in its assembly throws its shaft support bearing off center considerably due to magnification of the error by the length of the concavity. Since in a number of reproduction machines a shaft that is journaled to the machine frame is cantilevered from the frame to support the photoconductivity drum without exterior support, more runout is observed on the inboard side of the photoconductor drum than on the outboard side.

A solution to the above-mentioned problems of drum run-out is particularly desirable for reproduction machines incorporating magnetic brush rollers in the development process instead of cascade development because reducing the radial drum run-out minimizes the effects of the drum tolerances on the spacing between the drum and the magnetic rollers.

Accordingly, it is an object of the present invention to provide a drum support apparatus that reduces drum run-out.

Another object of this invention is to reduce copier maintenance in the field.

Yet another object of this invention is to maintain the outside surface of the drum concentric relative to the shaft from which the drum is supported and thereby decrease the possibility of incurring drum run-out.

A still further object of this invention is to minimize the radial run-out of a copier drum by installing at the manufacturing site and shipping to the field, drums with pre-assembled interior webs.

SUMMARY OF THE INVENTION

In a drum support assembly including a shaft for supporting a drum thereon, an improvement is disclosed from a drum having outer and inner cylindrical surfaces comprising grooves spaced from the ends and located on the inner surface of the drum for cooperating with a supporting web. The web is adapted to be placed on the shaft and fitted within the grooves on the inner surface of the drum in order to maintain the outer surface of the drum relative to the shaft and thereby reduce drum run-out.

BRIEF DESCRIPTION OF THE DRAWINGS

For a better understanding of the invention as well as other objects and further features thereof, the following detailed description of one example of the invention and the accompanying drawings are provided, which are generally to scale, wherein.

DESCRIPTION OF THE PREFERRED EMBODIMENT

The present invention can be used in other devices that require support for a drum. However, the invention will be described within the development of a xerographic reproduction apparatus, for which it is particularly suited. An example of such a reproduction apparatus is shown in U.S. Pat. No. 3,775,008 in the name of R. A. Shaeffer and is incorporated herein by reference. Examples of prior drum support members include U.S. Pat. Nos. 2,089,401; 2,638,722; 2,890,517; 2,918,867; 3,536,397; 3,536,485; 3,584,808; 3,615,063; and 3,739,722.

It is generally recognized that photoreceptor drum runout is a significant contributor to field maintenance problems and that it degrades copy quality. The photoreceptor drum is the heart of a xerographic copier. As each copy is reproduced, a bar of light scans the original document, and then transmits its reflective image through lenses to a revolving charged selenium coated drum. Because of the photoconductivity of the drum, the light discharges the electrical charges, leaving a latent image corresponding to the image on the document. The drum then rotates through a developing station containing powdered ink, which coats the charged areas. The sheet of paper is then precisely applied over the developed image. The other image is then transferred electrically to the paper. After transfer the paper is stripped from the drum and passed through a fuser which fixes the image to the paper. To accomplish this, the drum must be (A) discharged, (B), cleaned, (C) charged, (D) exposed, (E) developed, (F) covered with paper, and (G) stripped off the paper and image, for each copy made. To achieve and maintain reliably good copy quality, the radial dimensions and electrical tolerances in the cavity between the drum and the stations A through G must be closely maintained. Any out-of-roundness or imperfections in the drum surface may result in copy quality variations or possible drum damage, due to interference.

One of the most prevalent methods of bringing the powdered ink or developer material into contact with an image-bearing photoconductor is to pour or cascade developer material over the photoconductor, permitting the material to gravity flow downwardly and contact with the photoconductor for a sufficient period of time to effect development. With this method of development, it is satisfactory to support the photoconductive drum on a cantilevered support. However, in order for xerographic machines to use magnetic brush development with the developer material being transported through a development zone adjacent the imaged photoconductor by the magnetic brushes, radial drum run-out or "wobbling" of the drum must be controlled because space between the drum and magnetic brush rollers must be maintained within allowable tolerances or degrading copy quality will result.

Figure 1:
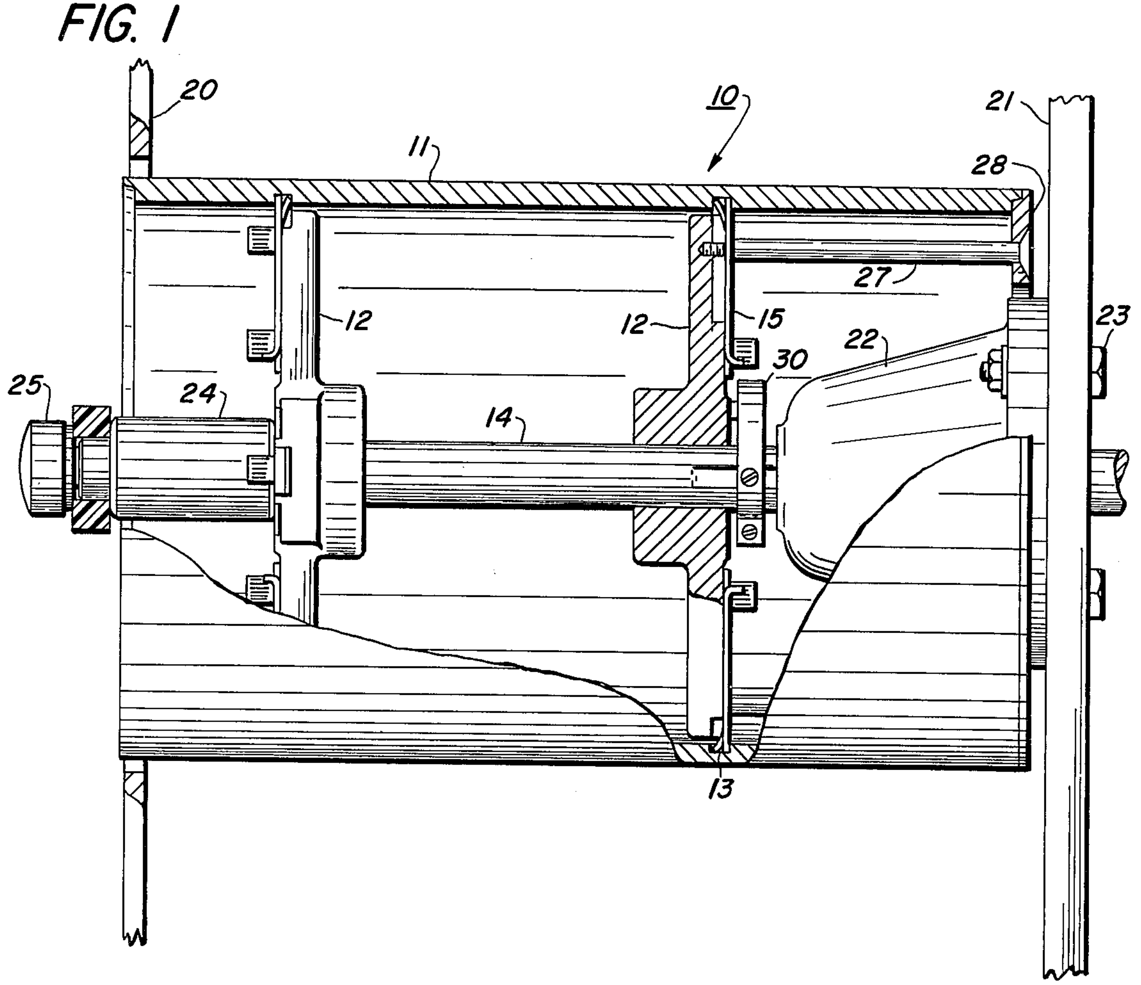
FIG. 1 is a partially broken away side view of an exemplary apparatus incorporating the invention.
Figure 2:
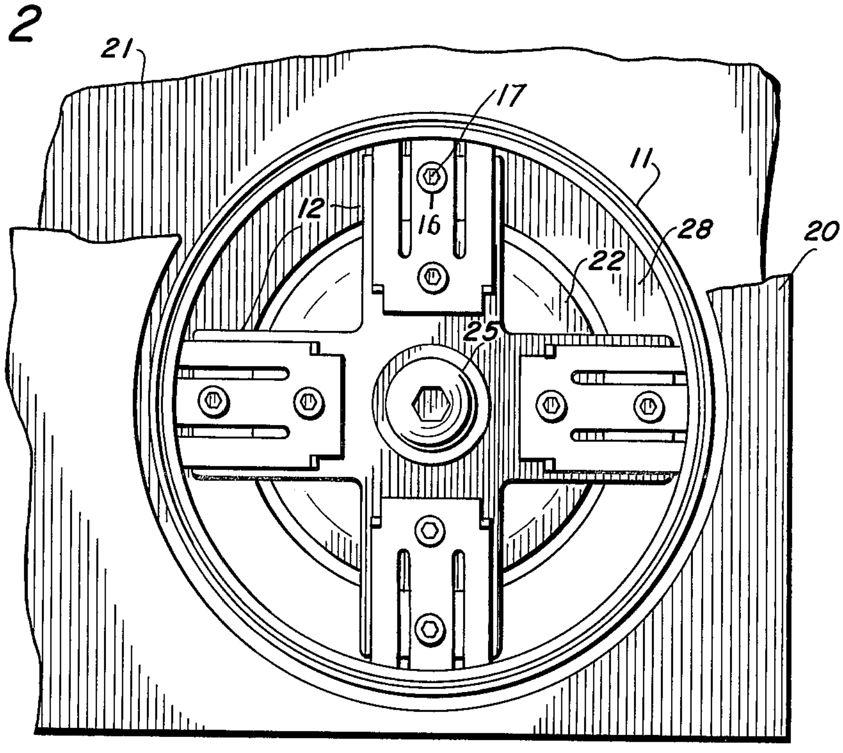
FIG. 2 is an end view, as viewed from the outboard end, of the apparatus of FIG. 1.

In reference to FIG. 1, the present invention is shown incorporated into a reproduction machine similar to the Xerox 4000. As is shown in the figure, a frame with a front panel 20 and a rear panel 21 for an optical imaging apparatus 10 is shown supporting a shaft 14 that is cantilever-mounted to the frame. Web means or hubs 12 are shown being supported on the shaft with a rear inboard endbell 22 having a pronounced cavity thereon that fits over shaft 14. Lock plate means 15 are located on the outer surface of the hubs or webs that fit into holding or groove means 13 to produce interface fit between the hub and the drum in order to diminish photoreceptor drum run-out. A photosensitive member 11 is shown as being placeable over the webs 12 which with inboard endbell 22 and tapered mating portion 28 are shown as being adaptable to partially close the end of the drum adjacent frame member 21. Tie-rods 27 extend through mating portion 28, through the interior of drum 11 and through the complementary openings in one of the hubs 12 and have threads thereon that allow the tie rods 27 to tighten the hub to the drum. A similar bolt 17 serves the same function in relation to the other hub. Dog 30 connects rotation of the support shaft to the drum through webs 12, and spacer 24 allows knob 25 to extend beyond frame 20.

It is within the area of the webs or hubs 12 that the present structure particularly departs from conventional mounting systems. The hub or mounting support is composed of a disc of preferably an aluminum die casting, which has a centrally positioned shaft bushing. Radiating from this center are four spokes 90° apart. The spokes are about 1.5 inches wide and about 1/16 inch to ⅛ inch deep. Although it is preferable to use four spokes as shown, it should be understood that three spokes which could be 120° apart would work also. Over each slot or groove 13 is a sliding latch or lock plate 15 about 2 inches wide, and a 1/16 inch thick stock, which is retained by two bolts 17 running through holes in the latch.

The drum cylinder is mounted on the two or more spaced mounting discs, which in turn conventionally mount through central apertures therein over the machine mounting shaft 14. The interior surface of the drum cylinder 11 has two annular mounting grooves 13 located intermediate the drum length and substantially spaced apart and each of the two mounting discs have two to four circumferentially spaced independently radially adjustable to extendable lugs/or latches 15. The outer ends of each lug fit into the mounting grooves or discontinuities in the drum cylinder. Adjustment of the lugs' extensions relative to their mounting discs adjusts the drum cylinder position relative to the central mounting aperture of the mounting disc, and therefore, relative to the machine mounting shaft.

Member 28 is disclosed as an assembly alignment fixture as well as a means to ground the apparatus. One of the objects in reducing radial drum run-out is to reduce assembly interference. Hitting the rim of the drum during assembly, deforms the counterbore and therefore causes an out-of-tolerance condition to occur. This in turn increases the probability of run-out due to web or hub cocking or bending at assembly. The present invention removes this possibility by making the assembly of the drum and hubs at the manufacturing site, as opposed to assembly in the field. The drum shaft hole in the hub is centered with respect to the outside machined surface of the drum in an alignment fixture and locked into place. An assembly fixture to maintain concentricity between the drum shaft and the drum outside diameter is necessary at the manufacturing site and consists of the drum shaft mounted precisely in the center of a conical drum holding fixture. The drum which after being coated and inspected, is placed over the shaft and slipped onto a conical positioning guide. The webs, with latches withdrawn, are slipped onto the shaft and located at the grooves on the inside of the drum. The latches having serrated ends are then extended until they make contact with the bottom of the drum groove, after which the retaining bolts are fully torqued down. Tightening the retaining bolts causes the latches to deform by bending, and in turn causes the ends of the latches to twist and lock into the groove. By sufficient metal to metal friction and aided by a star washer means 16, the latches are prevented from sliding or loosening. Instead of being deformed into machined groove 13, it should be understood that this invention could also be practiced by designing the lock plate webs to include a "Z" shaped finger which could fit into a short molded recess in the drum interior surface. The webs are locked in place, and are never meant to be removed in the field. They stay with the drum throughout its life cycle, and can be re-used for a new drum. Removal is accomplished simply by releasing the latch deforming bolt or screw, sliding the latch back and removing the hub from the drum.

In present reproduction machines, drum mounting hubs provide for an interference fit between the mounting surfaces of the drum and the hub. Improper assembly of these items allows drum run-out to exceed levels compatible with proper machine operation resulting in scratched drums and copy quality problems. As can be seen from the above detailed description, the apparatus disclosed here is a departure from typical drum hub designs in that it utilizes a four-spoked cast aluminum hub centered by four sheet metal lock plates which are secured to the drum by gripping internal grooves cut into the drum and each assembly must be preassembled and inspected on a special fixture prior to shipping. Once assembled, the hubs and plates stay with the drum until it is scrapped or reconditioned.

In conclusion, it may be seen that this invention can eliminate field assembly of the drum and hubs and maintain the outside surface of the drum relative to the shaft from which the drum is supported and thereby decreases the possibility of incurring drum run-out.

In addition to the apparatus outlined above, many other modifications and/or additions to this invention will be readily apparent to those skilled in the art upon reading this disclosure, and these are intended to be encompassed within the invention claimed herein.

What is claimed is:

1. In a drum support assembly including a shaft for supporting a drum thereon, the improvement comprising:

(a) a drum having outer and inner surfaces, (b) web means adapted to be placed on said shaft, said web means comprising a plurality of individually adjustable circumferentially spaced lugs having serrated ends and located radially of said shaft, and (c) holding means in the surface of said drum, spaced intermediate the ends thereof and operatively connected to said web means whereby said outer surface of said drum and said shaft are maintained relative to one another.

2. The improvement of claim 1 wherein said holding means is a discontinuity in the inner surface of said drum.

3. The apparatus of claim 1 wherein said holding means is at least one annular groove.

4. The apparatus of claim 1 wherein said web includes at least three lugs.

5. The apparatus of claim 1 wherein said lugs are spaced 90° apart.

6. The apparatus of claim 1 wherein said lugs are spaced 120° apart.

7. The apparatus of claim 1 including tapered ends on said drum and an inboard endbell adapted to mate with said tapered ends of said drum whereby said drum is centered with respect to said web.

8. The improvement of claim 1 including retaining means for causing said lugs to deform by bending said scratched ends within said holding means and thereby locking said lugs within said holding means.

9. The improvement of claim 8 including means for preventing said lugs from loosening.

10. In an optical imaging apparatus including a photosensitive drum having an inner and outer surface and a frame, a shaft mounted to said frame, at least one interior support mounted on said shaft, said interior support having an outer surface adapted to be fitted with the inner surface of said drums for supporting said drum and a central mounting aperture for said shaft, the improvement comprising:

at least two annular grooves in the drum located intermediate the drum length and substantially spaced apart, said interior support including independently linearly extendable lugs having serrated ends that are adjustable relative to said interior support to adjust the drum position relative to the central shaft mounting aperture of the interior support, and therefore, adjusts the drum position relative to the machine mounting shaft, and tightening means for causing the lugs to deform by bending whereby said serrated ends of said lugs are caused to twist and lock into said grooves.

11. A method of preventing radial drum run-out in an optical imaging apparatus mounted in a frame and having a photosensitive drum that includes an inner and outer surface, and web supports for said drum that extend from a shaft that is cantilever mounted from said frame, comprising the steps of:

(a) forming grooves in the inner surface of said drum intermediate the ends thereof;

(b) placing said web supports that include radially extendable lugs adjacent said grooves, (c) extending said lugs having serrated ends into said grooves and, (c) torqueing said serrated ends to lock said web within said grooves whereby the outer surface of said drum is maintained relative to said shaft.

* * * * *